Sept. 22, 1970     N. E. HAGER, JR     3,529,473

NON-CONTACT TEMPERATURE MEASURING DEVICE

Filed Jan. 6, 1969

INVENTOR
NATHANIEL E. HAGER, JR.

BY *Theodore L. Thomas*

ATTORNEY

United States Patent Office 3,529,473
Patented Sept. 22, 1970

3,529,473
NON-CONTACT TEMPERATURE MEASURING
DEVICE
Nathaniel E. Hager, Jr., Lancaster, Pa., assignor to Armstrong Cork Company, Lancaster, Pa., a corporation of Pennsylvania
Filed Jan. 6, 1969, Ser. No. 789,342
Int. Cl. G01j 5/04, 5/12
U.S. Cl. 73—355          7 Claims

ABSTRACT OF THE DISCLOSURE

A non-contact temperature sensing device or probe. The temperature sensor is a quick-response thermocouple of two dissimilar metal foils joined at corresponding edges to form a thermocouple junction. The sensor is positioned at the top of a closed well which is recessed in a bottom plate. The bottom plate has associated therewith means for maintaining the bottom plate at a predetermined temperature. The sensor is electrically insulated from the top of the well. The sensor has electrical leads connecting to a device for sensing potential differences. A supporting body supports the plate, the sensor, the temperature maintaining means, and any other associated hardware, enabling the entire probe to be positioned near the object whose temperature is to be measured.

BACKGROUND OF THE INVENTION

Field of the invention

The invention relates generally to a non-contact temperature sensing device designed to measure temperature of stationary or moving objects quickly and accurately in corrosive or other hostile environments by measuring the departure in temperature of a sensing element from the temperature maintained by the portions of the probe which support and immediately surround the sensing element.

Description of the prior art

U.S. Pat. No. 3,354,720—Hager, issued Nov. 28, 1967, describes and claims a temperature-sensing probe in which the sensing element is electrically part of the probe body. The probe body is maintained at a predetermined temperature, and the sensing element detects departures from this temperature of the object to be measured. In some uses, it has been found that the prior probe responds to stray air and gas currents in a deleterious manner. Additionally, the sensing element of the prior probe is in some instances exposed to anomalous radiation, directly or indirectly, which renders it difficult to determine exactly which portions of an object are being scanned for temperature determinations. In contrast with the prior probe, the present probe is designed to limit the sensing element to a narrow line of sight, thus restricting radiation impinging on the sensing element to the radiation emanating from the desired object or portion of the object. However, narrowing the field of view reduces the size of the signal and increases the need for eliminating side effects. The sensing element, being placed at the top of a recessed well, is immersed in an environment maintained at a predetermined temperature thus minimizing reflected radiation or other erroneous radiation from interfering with the proper function of the sensing element. Additionally, the sensing element is independent in electrical circuitry of any portion of the entire device.

SUMMARY OF THE INVENTION

The non-contact temperature sensing device of the present invention has a bottom plate with a recessed well therein, the bottom plate and the well adapted by means of a suitable support to be positioned adjacent the object whose temperature is to be measured. The bottom plate, including the closed, recessed well, is adapted to be maintained at a predetermined temperature, the temperature normally to be that at which it is desired to maintain the target object. At the top of the well, under the closed end thereof, is positioned a sensing element made of dissimilar thermocouple foils, preferably copper and Constantan, joined at corresponding edges to form a thermocouple junction. The line of sights runs from the junction, down the length of the well to the target whose temperature is to be measured. The sensing element is electrically insulated from the bottom plate portion located at the top of the closed well. The electrical insulation is normally sufficiently thin that the sensing element assumes very nearly the temperature maintained in the bottom plate. Electrical leads connect the sensing element to a potentiometer or other device for sensing potential differences. The device also includes a supporting body for supporting the bottom plate and all the other elements of the probe.

With these structural features, it can be seen that the sensing element of the present probe has a limited line of sight, in that radiation from the target can only strike the sensing element by passing up the recessed well. Furthermore, the top of the well, its sides, and the flat, skirt portion of the bottom plate are all maintained at a predetermined temperature to minimize reflected and stray radiation from striking the sensing element to yield anomalous microvoltages in the sensing element.

DESCRIPTION OF THE PREFERRED EMBODIMENT

Figure 1:
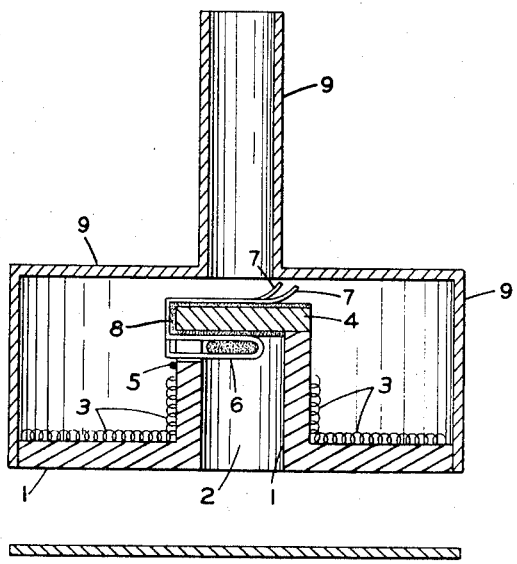
FIG. 1 is a sectional elevation of a non-contact probe of the present invention.

Referring to the drawings, the bottom plate 1 has a recessed well 2 therein. A heating element 3, in this case an electrical resistance heater, is positioned adjacent the bottom plate 1 to impart heat thereto. Although the drawing does not show that the resistance heating element 3 completely surrounds the recessed well 2, the resistance heating element 3 may well do so. Alternatively, heat may flow to the top plate 4 of the recessed well 2 simply by conduction of heat through the metal which comprises the bottom plate 1. Such metal is preferably aluminum, and it will preferably be of a thickness in the range of ⅛ inch to ½ inch. A thermometer sensing element 5 is positioned at some convenient place on the bottom plate 1 or in the walls of recessed well 2 in order to determine the temperature of the bottom plate 1.

Figure 2:
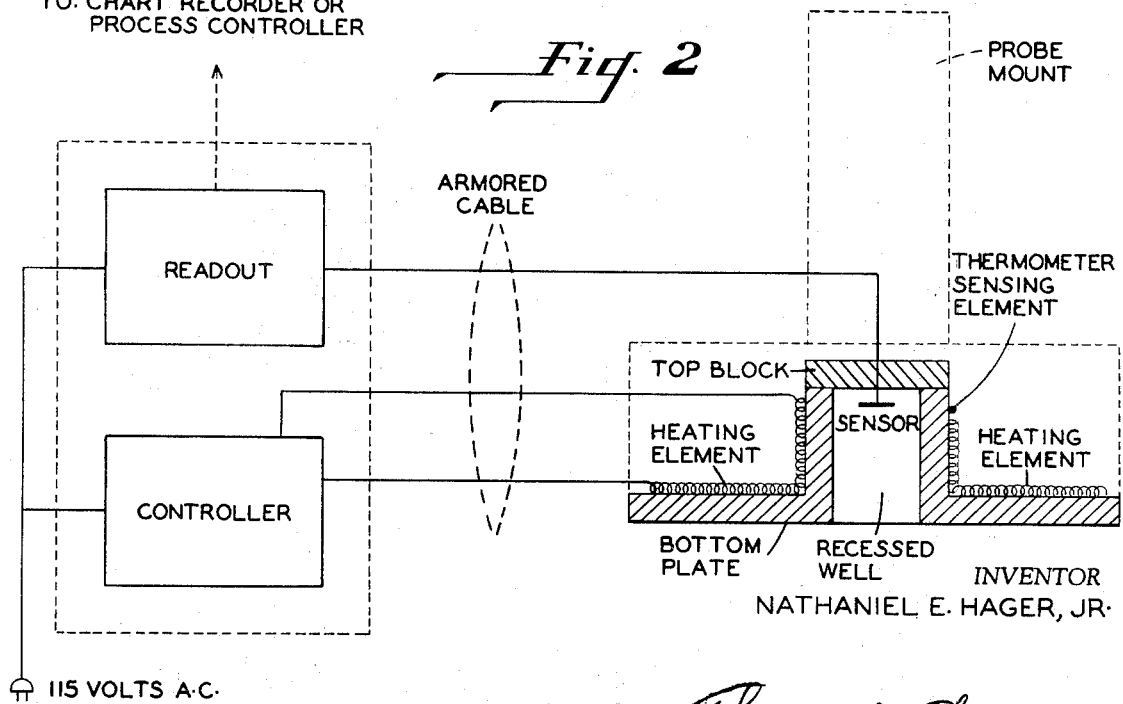
FIG. 2 is a schematic circuit diagram illustrating an arrangement for utilizing the probe of the present invention.

A quick-response temperature sensor 6 is positioned at the closed end of the recessed well 2. Electrical leads 7 from the sensor 6 connect the sensor 6 to a device for sensing potential differences, as shown in FIG. 2. The sensor 6 is separated from the top 4 of the recessed well 2 by means of electrical insulation 8. A suitable supporting body 9, which is preferably of metal but which may be of any suitable material such as a plastic, resin reinforced glass fabric, or ceramic, serves to support the various elements of the probe.

To facilitate changing damaged sensors, the top 4 of the recessed well 2 may simply screw in place instead of being an integral part of the recessed well 2. In this manner, the top block 4 with the sensor or sensing element 6 secured to it may simply be replaced as a unit in the event the thin foil sensing element 6 is damaged.

In such case, the block 4 should be in good thermal contact with the walls of the recessed well 2.

The effect of embedding the sensor 6 in the recessed well 2 which is part of the bottom plate 1, all maintained at the same controlled temperature, is to make the overall probe less sensitive to the distance between it and the object whose temperature is to be measured. Since the sensor 6 is positioned at the closed end of the recessed well 2, the recessed well 2 serves as a viewing chamber which limits the line of sight of the sensor 6 to a relatively small portion of the target. Essentially, the entire environment of the sensor 6, except for the small portion of the target, is controlled and maintained at the same predetermined temperature, and the sensor will therefore develop microvoltages depending on whether the portion of the target sensed is warmer or cooler than the predetermined temperature in the bottom plate 1.

The sensor 6 is made of thin metallic foils having a thermocouple junction therein in order to minimize heat capacity and lag in the sensing element itself. Although a simple junction may be used in the foils, it is preferred that the sensor described in U.S. application Ser. No. 483,738, filed Aug. 30, 1965, now U.S. Pat. No. 3,354,720, be used. In such case, the copper leads 7 from the sensor should be fastened to the top 4 of the recessed well with a thin adhesive film for a distance of at least an inch or two from the sensing element itself. Such an arrangement stabilizes the leads at a temperature close to that of the sensor at all times, regardless of heat fluxes between the leads and their surroundings. As long as the leads are kept at or very close to the same temperature as the sensor, they cannot modify its temperature. These leads and the whole circuit surrounding the sensor are preferably pure copper, and all connections are either welded or crimped with copper crimping fittings in order to avoid introducing another metal into the circuit which could give rise to parasitic EMF.

The electrical insulation 8 which separates the heat sensing element or sensor 6 from the top 4 of the recessed well 2 may be a heat-resistant varnish or any other suitable material. It is preferred that such electrical insulation be as thin as possible consistent with good insulation in order that there be little or no temperature drop between the top 4 and the sensor 6. Thin, resin-saturated fabrics may serve where varnish or resin coatings are insufficient.

It is preferred that the recessed well 2 have a depth: width ratio of at least about 1:1. The need will seldom arise for a ratio greater than 3:1. The diameter of the well will normally be one-eighth to one-third the width of the entire bottom plate, with one-sixth being a good average.

The probe of the present invention functions best at a temperature range from about room temperature to about 450° F. This means that the temperature of the bottom plate including the recessed well will be set to level out equal or close to a temperature within that range. The output readings of the sensing element of the device are ordinarily made within a region extending 50° to 100° F. on either side of the reference temperature. The response time for the probe is usually on the order of one second. Temperatures are easily measured to within 5° F. and changes on the order of 1° to 2° F. can readily be detected. Where the probe is used to monitor the temperature of sheet goods traveling over supports during manufacturing processes, it has been found that the probe is insensitive to variations in the color of the goods. The probe is unaffected by gases and vapors such as plasticizer vapors where plasticized sheets of poly(vinyl chloride) are being treated. Since the probe is heated, condensates do not form on it. There are no lenses or mirrors to be cleaned. Although a mounting height of about 3 inches has been found to be best when used above such moving sheets of plasticized poly(vinyl chloride), the probe can be mounted at heights varying from a fraction of an inch up to about five inches. If stray air or gas currents are sufficiently violent to create convective differences in the recessed well, a shield may be appended to the bottom plate to minimize the effects of such drafts.

For best performance it is preferred to blacken the exposed surface of the sensor to increase its emissivity. The bottom of the bottom plate, including the interior of the recessed well may also be blackened. In this sense, the term "blacken" means to coat with a layer opaque to infrared radiation; such a coat may or may not appear black to the human eye.

I claim:

1. An improved probe for non-contact temperature measurement comprising
   (1) a bottom plate having a recessed well therein, said plate having a planar bottom surface and said well having an open end in the bottom surface of said bottom plate, a closed end having electrical insulation thereon and spaced from said open end, and an uninterrupted cylindrical inner wall surface extending from said open end to said closed end, the axis of said well being aligned perpendicularly to the plane of the bottom surface of said bottom plate,
   (2) means for heating and maintaining said bottom plate and said recessed well at a predetermined temperature,
   (3) a quick-response, temperature sensor of two dissimilar metal foils joined at corresponding edges to form a thermocouple junction and positioned at the closed end of said recessed well in physical contact therewith whereby said thermocouple junction is maintained at substantially the same temperature as said well's closed end and is exposed unobstructedly to the object whose temperature is to be measured,
   (4) electrical leads from said sensor to a device for sensing potential differences, said leads being in physical contact with the closed end of said recessed well, and
   (5) a supporting body for said plate, said sensor, and said temperature maintaining means.

2. A probe according to claim 1 in which said bottom plate comprises aluminum plate.

3. A probe according to claim 1 wherein said means for maintaining said bottom plate and said recessed well at a predetermined temperature comprises electrical heating means.

4. A probe according to claim 1 wherein said electrical insulation comprises a varnish.

5. A probe according to claim 1 wherein said temperature sensor comprises copper foil and Constantan foil.

6. A probe according to claim 1 wherein the closed end of said recessed well comprises a removable block having said sensor mounted thereon.

7. A probe according to claim 1 wherein the bottom surface of said bottom plate carries a coating opaque to infrared radiation.

References Cited

UNITED STATES PATENTS

| 2,611,541 | 9/1952 | Gray. | |
| 2,811,856 | 11/1957 | Harrison | 73—355 |
| 3,282,107 | 11/1966 | Ekstrom | 73—355 |
| 3,354,720 | 11/1967 | Hager | 73—355 |

S. CLEMENT SWISHER, Primary Examiner

F. SHOON, Assistant Examiner

U.S. Cl. X.R.

136—213